United States Patent
Little et al.

(10) Patent No.: US 8,553,885 B2
(45) Date of Patent: Oct. 8, 2013

(54) WIRELESS PERSONAL AREA NETWORK HAVING AUTHENTICATION AND ASSOCIATED METHODS

(75) Inventors: Herbert A. Little, Waterloo (CA); Scott D. Rose, Waterloo (CA); Scott W. Totzke, Waterloo (CA); Mihal Lazaridis, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 2048 days.

(21) Appl. No.: 11/044,959

(22) Filed: Jan. 27, 2005

(65) Prior Publication Data

US 2006/0165236 A1    Jul. 27, 2006

(51) Int. Cl.
    *H04K 1/00*    (2006.01)
(52) U.S. Cl.
    USPC ............................................. 380/270; 726/35
(58) Field of Classification Search
    USPC .................... 380/270, 44; 702/127; 705/41;
                          713/169, 168, 151; 455/41
    See application file for complete search history.

(56) References Cited

U.S. PATENT DOCUMENTS

| 5,629,981 | A | 5/1997 | Nerlikar | 380/25 |
| 5,770,849 | A | 6/1998 | Novis et al. | 235/492 |
| 6,003,135 | A | 12/1999 | Bialick et al. | 713/201 |
| 6,070,240 | A | 5/2000 | Xydis | 713/200 |
| 6,088,802 | A | 7/2000 | Bialick et al. | 713/200 |
| 6,307,471 | B1 | 10/2001 | Xydis | 340/568.1 |
| 6,456,958 | B1 | 9/2002 | Xydis | 702/158 |
| 6,526,264 | B2 | 2/2003 | Sugar et al. | 455/84 |
| 6,538,606 | B2 | 3/2003 | Quinn et al. | 343/702 |
| 6,628,934 | B2 | 9/2003 | Rosenberg et al. | 455/411 |
| 6,671,351 | B2 | 12/2003 | Menard et al. | 379/45 |
| 6,715,679 | B1 | 4/2004 | Infosino | 235/449 |
| 6,732,278 | B2 | 5/2004 | Baird, III et al. | 713/201 |
| 6,744,874 | B2 | 6/2004 | Wu | 379/220.01 |
| 6,745,259 | B2 | 6/2004 | Wagner | 710/33 |
| 6,763,315 | B2 * | 7/2004 | Xydis | 702/127 |
| 6,763,336 | B1 | 7/2004 | Kolls | 705/44 |

(Continued)

FOREIGN PATENT DOCUMENTS

| CN | 1561649 | 1/2005 |
| GB | 2377788 | 1/2003 |
| WO | 03/021523 | 3/2003 |

OTHER PUBLICATIONS

Pilsoon Choi, An Experimental Coin-Sized Radio for Extremely Low-Power WPAN (IEEE 802.15.4) Application at 2.4 GHz, Dec. 2003, IEEE, vol. 38, No. 12.*

(Continued)

*Primary Examiner* — Mohammad W Reza
*Assistant Examiner* — Monjour Rahim
(74) *Attorney, Agent, or Firm* — Allen, Dyer, Doppelt, Milbrath & Gilchrist, P.A.

(57) ABSTRACT

A wireless personal area network (WPAN) system includes a plurality of WPAN devices using encrypted wireless communication therebetween when in an enabled state and not wirelessly communicating when in a disabled state. At least one of the WPAN devices includes a WPAN identity reader for reading at least one identifying parameter of a user, for confirming that the user is an authorized user based upon reading the at least one identifying parameter, and for wirelessly communicating with at least one other WPAN device to switch the at least one other WPAN device from the disabled state to the enabled state based upon confirming the user is an authorized user.

17 Claims, 7 Drawing Sheets

(56) References Cited

U.S. PATENT DOCUMENTS

| | | | |
|---|---|---|---|
| 6,769,062 B1 | 7/2004 | Smeets et al. | 713/189 |
| 6,961,541 B2* | 11/2005 | Overy et al. | 455/41.2 |
| 6,978,023 B2* | 12/2005 | Dacosta | 380/258 |
| 2002/0104012 A1 | 8/2002 | Xydis | 713/200 |
| 2003/0007641 A1* | 1/2003 | Kinoshita | 380/270 |
| 2003/0018591 A1 | 1/2003 | Komisky | 706/1 |
| 2003/0220765 A1 | 11/2003 | Overy et al. | 702/158 |
| 2004/0143550 A1* | 7/2004 | Creamer et al. | 705/41 |
| 2004/0172536 A1* | 9/2004 | Malville et al. | 713/169 |
| 2005/0044424 A1 | 2/2005 | Xydis | 713/201 |
| 2005/0147245 A1* | 7/2005 | Hassan et al. | 380/44 |
| 2005/0223227 A1* | 10/2005 | DeLeeuw | 713/168 |
| 2007/0050615 A1* | 3/2007 | Xu et al. | 713/151 |

OTHER PUBLICATIONS

"Wireless IntelliMouse® Explorer with Fingerprint Reader", Jan. 2005, Microsoft, available at www.microsoft.com/hardware/mouseandkeyboard/productdetails.aspx?pid=035.

"Bluefire Disables Bluetooth and Infrared Device Communication with New Version of Mobile Security Software", Baltimore, May 4, 2004, available at www.itsecurity.com/tecsnews/may2004/may38.htm.

Product Overview, Bluefire Mobile Firewall Plus V3.0, available at www.bluefiresecurity.com.

"Handheld Security Solutions for Government and Military Organizations", 2004, available at www.bluefiresecurity.com/solutions_gov.php.

"NIST Wireless Security Guidance SP 800-48", Dec. 4, 2002, Special Publication 800-48, available at csrc.nist.gov/publications/nistpubs/index.html.

"Credent Mobile Guardian Adds Proximity based Security to Handhelds", Oct. 10, 2006, available at www.geekzone.co.nz/content.asp?contentid=6742.

"Kaiser Takes Authentication Wireless", Matt Hines, Jan. 31, 2007, available at www.eweek.com/article2/01895,2089176,00.asp?kc=EWEWEMNL020107EP30D.

"Wristwatch Will Lock a PC", Stan Miastkowski, Aug. 22, 2000, available at www.computerworld.com.au/index.php/id:68594681.

"Ensure Technologies Makes Proximity-Based Authentication Available in Epic Software" Dec. 7, 2004, Ensure Technologies 2004, available at www.ensuretech.com/company/pressroom/releases/12.07.04.html.

"XyLoc for the Healthcare Industry", Ensure Technologies 2004, available at www.ensuretech.com/products/MD/md.html.

* cited by examiner

WIRELESS PERSONAL AREA NETWORK HAVING AUTHENTICATION AND ASSOCIATED METHODS

FIELD OF THE INVENTION

The present invention relates to the field of wireless networks, and, more particularly, to systems for providing authenticated proximity access to wireless networks and related methods.

BACKGROUND OF THE INVENTION

Electronic computing devices have increased productivity in the workplace by enabling the easy transportation and transmission of data. However, the easy transportation and transmission of data has also created problems for those tasked with protecting an organization's confidential data.

To address this problem a number of authentication mechanisms such as card readers, biometric sensors, and fob keyless entry devices, and the like have been devised. The use of such authentication mechanisms can provide an organization with control over user access to an electronic device as well as control over user access to data on the electronic device. For example, U.S. Pat. No. 5,610,981 to Mooney et al. discloses a secure computer controlling the access to data storage devices via a card reader.

U.S. Pat. No. 6,003,135 to Bialick et al. discloses a device that communicates with a host computing device to enable one or more security operations to be performed by the modular device on data stored within the host computing device, data provided from the host computing device to the modular device, or data retrieved by the host computing device from the modular device.

U.S. Pat. No. 6,763,336 to Kolls discloses a universal server that wirelessly networks a plurality of portable digital devices to an electronic commerce terminal. The system can include authentication mechanisms such as a smart card reader, a keypad, a magnetic card reader, or biometric sensors.

U.S. Pat. No. 6,715,679 to Infonsino discloses a universal card that can be deployed as an access card. A universal card reader can read the universal card and the universal card reader can communicate with various electronic devices such as a cellular telephone, a personal digital assistant, or a personal computer. The universal card reader includes an interface that may be a wired interface, or a wireless interface such as an antenna for communicating via radio waves and/or an infrared communications interface.

U.S. Pat. No. 6,732,278 to Baird, III et al. discloses a device for providing access to a remote site. Access to the device is gained through an authentication process during which a user password and biometrics are provided to the device. Once authenticated, the device authorizes access to a remote site (e.g., a web site or a server on a local area network).

Unfortunately, such conventional systems have a number of shortcomings. For instance, once a user is signed onto an electronic device, the user can remain signed onto the electronic device even though the user walks away from the electronic device. Another shortcoming is that a user usually has to be authenticated for each device that has an authentication mechanism.

SUMMARY OF THE INVENTION

In view of the foregoing background, it is an object of the invention to provide systems and methods that provide a proximity authentication mechanism between short-range wirelessly communicating electronic devices.

This and other objects, features, and advantages in accordance with the invention are provided by a wireless personal area network (WPAN) system that includes a plurality of WPAN devices using encrypted wireless communication therebetween when in an enabled state and not wirelessly communicating when in a disabled state. At least one of the WPAN devices preferably comprises a WPAN identity reader for reading at least one identifying parameter of a user and for confirming that the user is an authorized user based upon reading the at least one identifying parameter. The WPAN identity reader may also wirelessly communicate with at least one other WPAN device to switch the at least one other WPAN device from the disabled state to the enabled state based upon confirmation that the user is an authorized user. Accordingly, authenticated proximity access in a WPAN system is advantageously enabled.

The plurality of WPAN devices may have a limited communication range and the at least one other WPAN device when in the enabled state switches back to the disabled state based upon movement beyond the limited communication range with the WPAN identity reader. The WPAN system further may include an identifying token carried by a user and the WPAN identity reader reads the identifying token when in proximity thereto.

The WPAN identity reader may continue to wirelessly communicate with the at least one other WPAN device to maintain the at least one other WPAN device in the enabled state as long as the identifying token is in proximity to the WPAN identity reader. The identifying token may further include encryption data carried by a substrate and the encryption data may include at least one of a public and private encryption key.

The at least one other WPAN device may be operable to permit user operation thereof when in the enabled state. The at least one other WPAN device may be operable upon user entry of a password in addition to being in the enabled state. The WPAN devices may wirelessly communicate using a Bluetooth protocol and/or a Federal Information Processing Standard (FIPS) compliant encryption protocol. At least one of the plurality of WPAN devices may include a computer, a printer, a scanner, a camera, a barcode scanner, a Global Positioning System (GPS) device, a personal digital assistant, and a wireless email device, for example.

The WPAN identity reader may comprise a portable housing and a reader carried by the portable housing for reading the at least one identifying parameter of a user. The WPAN identity reader may also include a limited communication range WPAN transceiver carried by the portable housing. The WPAN identity reader may further comprise a processor carried by the portable housing and connected to the reader and the limited communication range WPAN transceiver. The reader may include at least one of a magnetic stripe reader, a smart card reader, and a biometric characteristic reader, for example.

A method aspect of the invention is for operating a WPAN system that includes a plurality of WPAN devices with at least one of the WPAN devices comprising a WPAN identity reader. The method may include using the WPAN identity reader for reading at least one identifying parameter of a user, confirming that the user is an authorized user based upon reading the at least one identifying parameter, and wirelessly communicating with at least one other WPAN device to switch the at least one other WPAN device from a disabled state to an enabled state based upon confirming the user is an authorized user. The at least one other WPAN device may use encrypted wireless communication when in the enabled state and not wirelessly communicating when in the disabled state.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
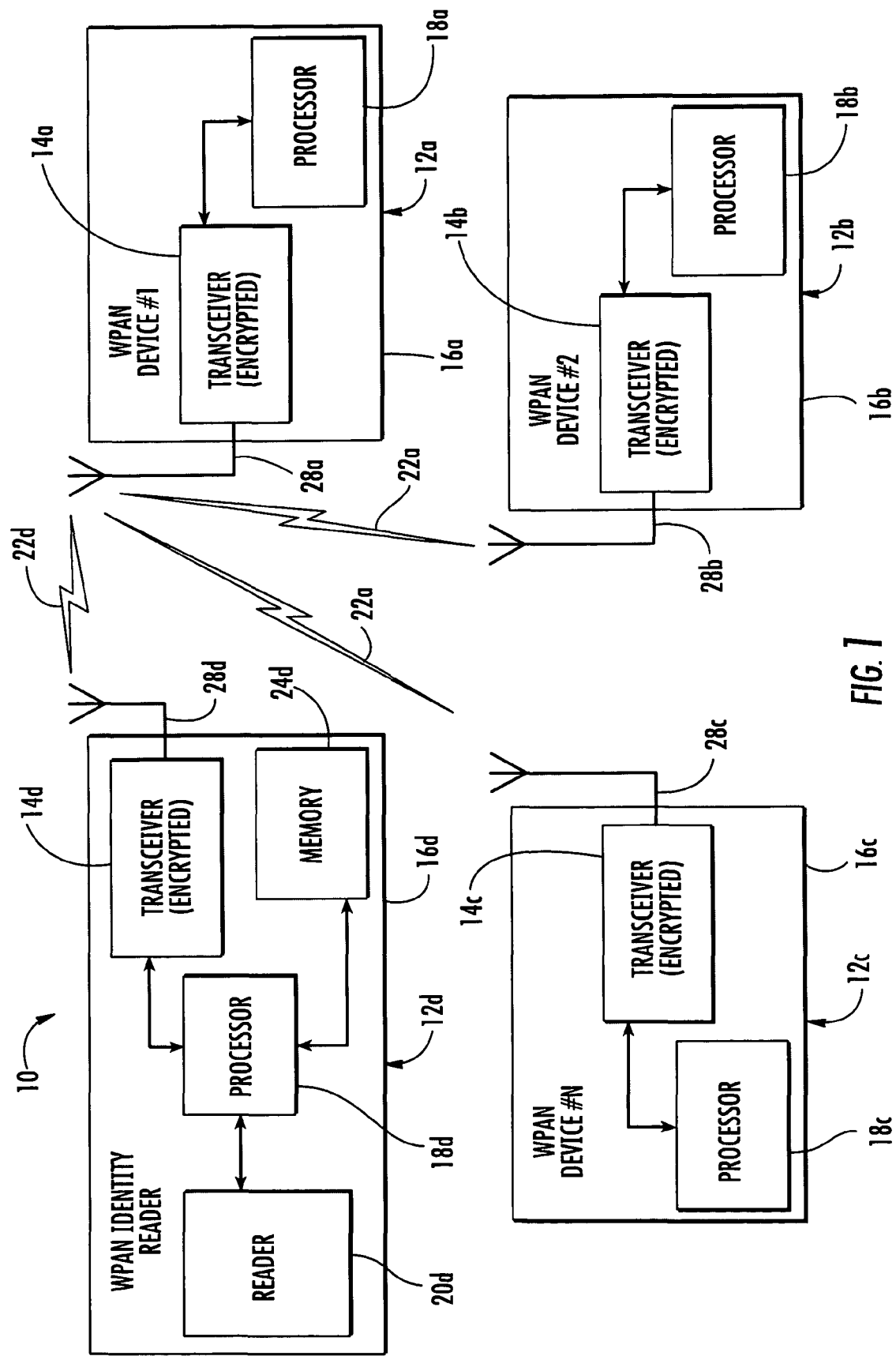
FIG. 1 is a schematic diagram of the WPAN system for proximity access according to the invention.

Referring initially to FIG. 1, the basic components and interconnections of a wireless personal area network (WPAN) system 10 for authenticated proximity access in accordance with the invention are now described. A WPAN is a wireless personal area network that enables the interconnection of WPAN devices that are within proximity of each other. The proximity range is normally about 10 meters between WPAN devices, or a few kilometers between a WPAN device and a central server, for example. Technical specifications for some WPAN devices can be found in the IEEE 802.15 standard and other similar standards as will be appreciated by those skilled in the art.

The WPAN system 10 illustratively includes a plurality of WPAN devices 12a-12d. Each WPAN device may include a respective portable housing 16a-16d and respective limited communication range WPAN transceiver 14a-14d carried by the corresponding portable housing. Each limited communication range WPAN transceiver 14a-14d may use a respective antenna 28a-28d and may be capable of encrypted communications over links 22a, 22d. Each WPAN device 12a-12d may also include a respective processor 18a-18d carried by the corresponding portable housing 16a-16d and connected to its limited communication range WPAN transceiver 14a-14d.

One of the WPAN devices is illustratively a WPAN identity reader 12d that illustratively includes a reader 20d carried by the portable housing 16d and connected to the processor 18d. The reader 20d can be used for reading at least one identifying parameter of a user, for example. The reader 20d may comprise at least one of a magnetic stripe reader, a smart card reader, and a biometric characteristic reader as will be appreciated by those skilled in the art. The WPAN identity reader 12d may further include a memory 24d connected to the processor 18d.

The WPAN devices 12a-12d use encrypted wireless communication over links 22a, 22d therebetween when in an enabled state and do not wirelessly communicate when in a disabled state. The WPAN identity reader 12d is illustratively provided for reading at least one identifying parameter of a user and for confirming that the user is an authorized user based upon reading the identifying parameter. The WPAN identity reader 12d may also wirelessly communicate with at least one other WPAN device 12a-12c to switch the at least one other WPAN device from the disabled state to the enabled state based upon confirmation that the user is an authorized user. Accordingly, authenticated proximity access in the WPAN system 10 is advantageously enabled.

Figure 2:
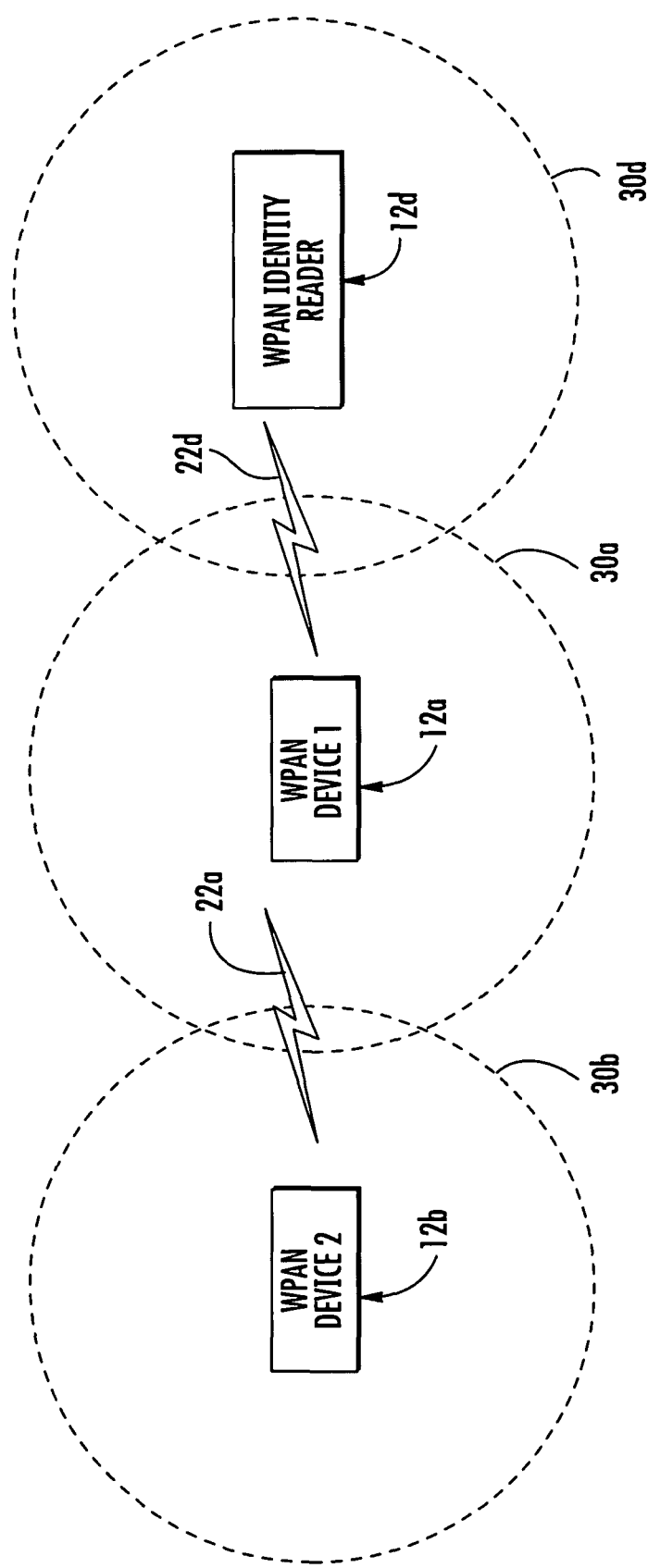
FIG. 2 is a schematic diagram of the WPAN system shown in FIG. 1 illustrating the WPAN devices in an enabled state.

A more detailed explanation of the operation of the WPAN system 10 is explained with reference to FIGS. 2 and 3. The WPAN devices 12a, 12b, 12d each have a limited communication range indicated by range circles 30a, 30b, 30d in which the WPAN devices are able to communicate as will be appreciated by those skilled in the art. For example, when the range circle 30a overlaps the range circle 30d, the WPAN device 12a and the WPAN identity 12d use encrypted wireless communication link 22d therebetween when in an enabled state as seen in FIG. 2. In addition, when WPAN device 12a is enabled and the range circle 30a overlaps range circle 30b, the WPAN device 12a and the WPAN device 12b use encrypted wireless communication link 22a as also seen in FIG. 2.

Figure 3:
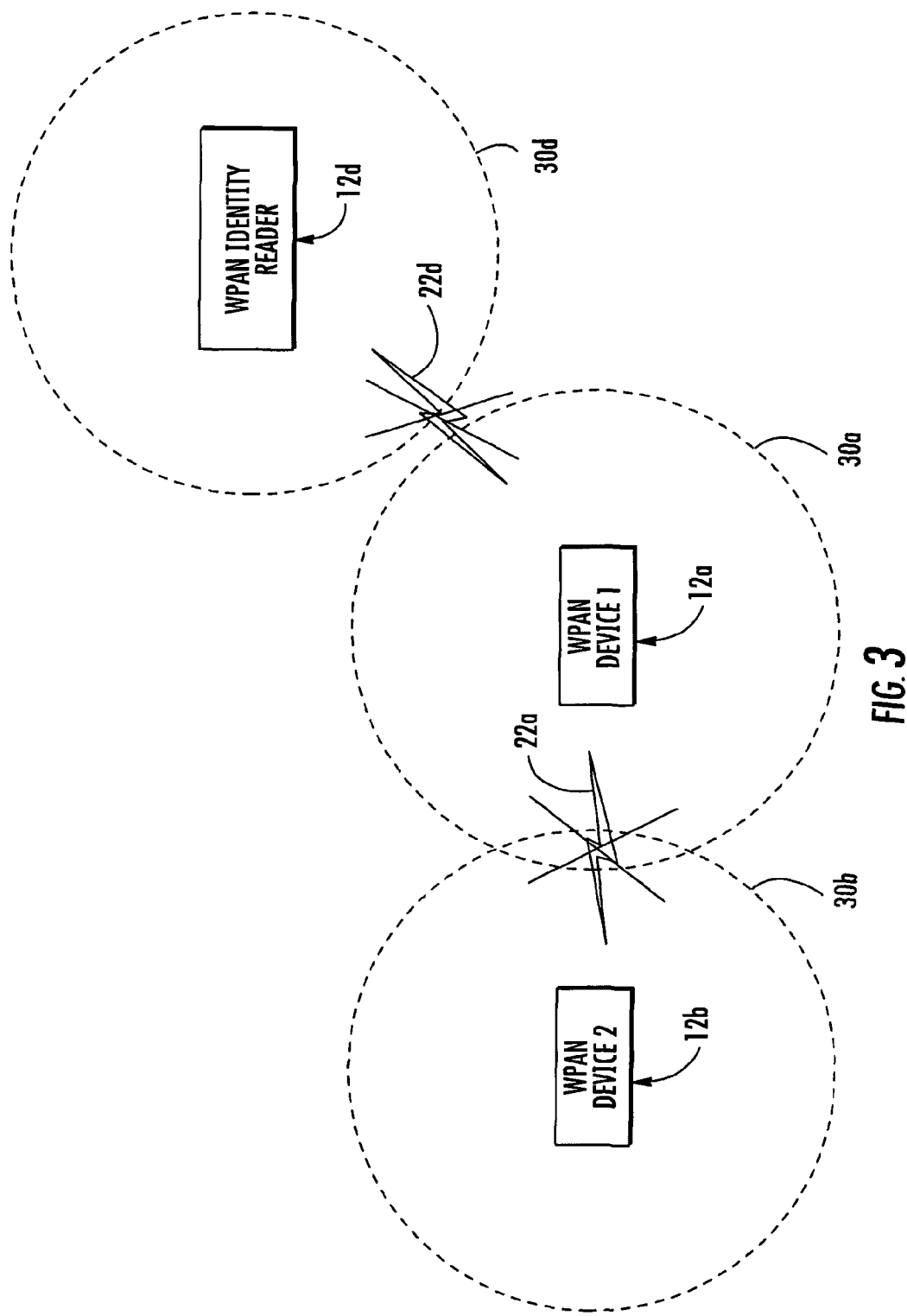
FIG. 3 is a schematic diagram of the WPAN system shown in FIG. 1 illustrating the WPAN devices in a disabled state.

As shown in FIG. 3, when the range circle 30a does not overlap the range circle 30d, the WPAN device 12a and the WPAN identity 12d do not use encrypted wireless communication link 22d therebetween and WPAN device 12a is not enabled. The communications link 22d is no longer operative as indicated by the "X". In addition, the WPAN device 12a is not enabled even though the range circle 30a overlaps the range circle 30b. The WPAN device 12a and the WPAN device 12b may not use encrypted wireless communication over the link 22a. In other words, when the range circle 30d no longer overlaps the range circle 30a, the WPAN device 12a can no longer communicate with the WPAN identity reader 12d. As a result, the WPAN device 12a may be disabled and this may also disable the WPAN device 12b.

Figure 4:
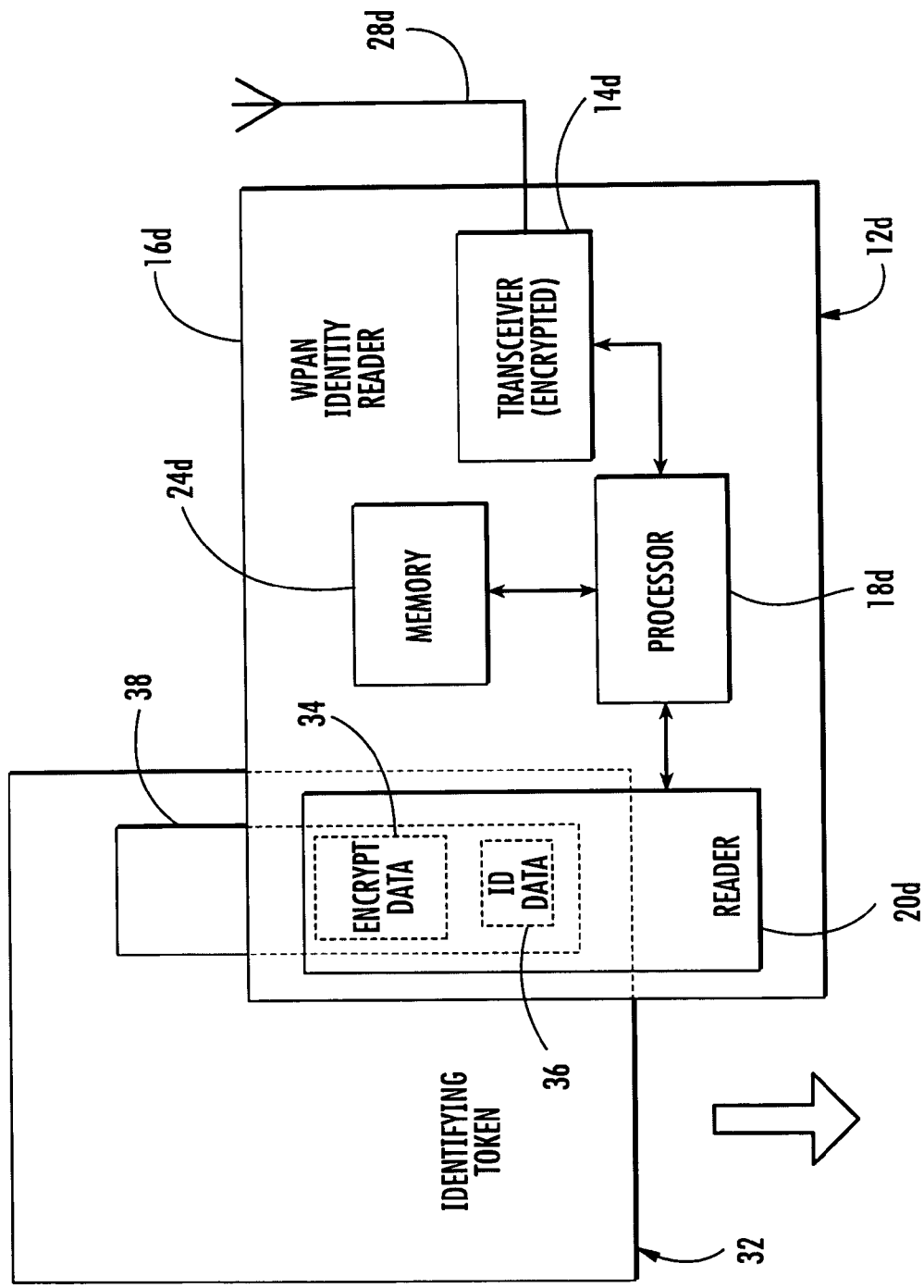
FIG. 4 is a more detailed schematic block diagram of a WPAN identity reader as shown in FIG. 1.

Referring now to FIG. 4, further details of the WPAN system 10 are explained. The WPAN system 10 further includes an identifying token 32 carried by a user and the WPAN identity reader 12d reads the identifying token 32 when in proximity thereto. The WPAN identity reader 12d may continue to wirelessly communicate with the at least one other WPAN device to maintain the at least one other WPAN device in the enabled state as long as the identifying token 32 is in proximity to the WPAN identity reader 12d.

As shown in the illustrated embodiment, the identifying token 32 may further include encryption data 34 carried by a substrate 38. The encryption data 34 may include at least one of a public and private encryption key as will be appreciated by those skilled in the art.

The at least one other WPAN device may be operable to permit user operation thereof when in the enabled state. The at least one other WPAN device may be operable upon user entry of a password in addition to being in the enabled state. The WPAN devices may wirelessly communicate using a Bluetooth protocol and/or a Federal Information Processing Standard (FIPS) compliant encryption protocol. At least one of the plurality of WPAN devices may include a computer, a printer, a scanner, a camera, a barcode scanner, a Global Positioning System (GPS) device, a personal digital assistant, and a wireless email device, for example.

Figure 5:
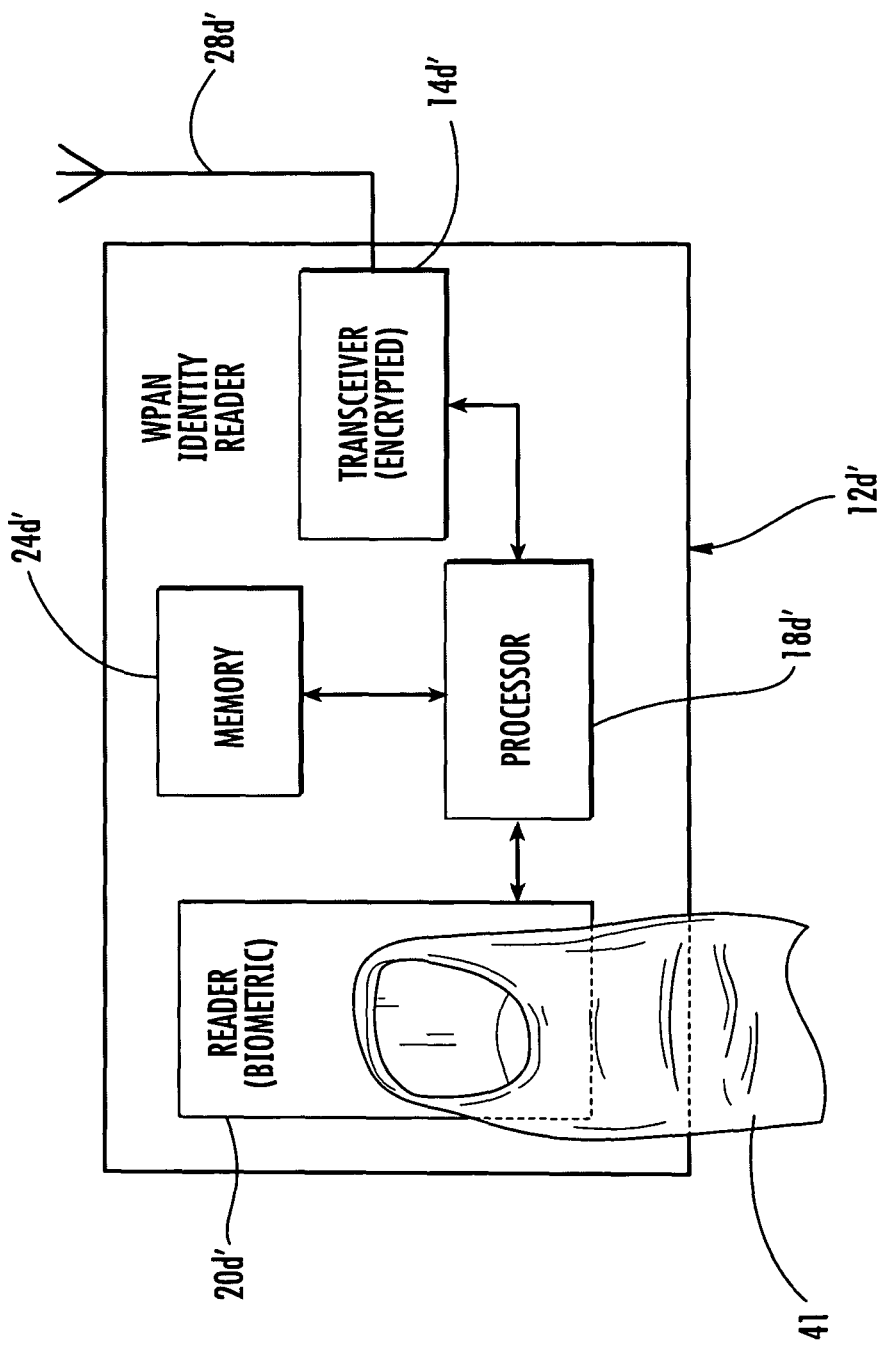
FIG. 5 is a schematic block diagram of an alternate embodiment of a WPAN identity reader as shown in FIG. 1.

An alternate embodiment of a WPAN identity reader 12d' is explained with additional reference to FIG. 5. The WPAN identity reader 12d' illustratively includes a biometric characteristic reader 20d'. In this embodiment, biometric characteristic reader 20d', is in the form of a fingerprint sensor. The data from the sensor is processed by the processor 18d' for determining a match between an enrolled authorized person and the person presently placing his finger 41 on the sensor as will be appreciated by those skilled in the art.

Figure 6:
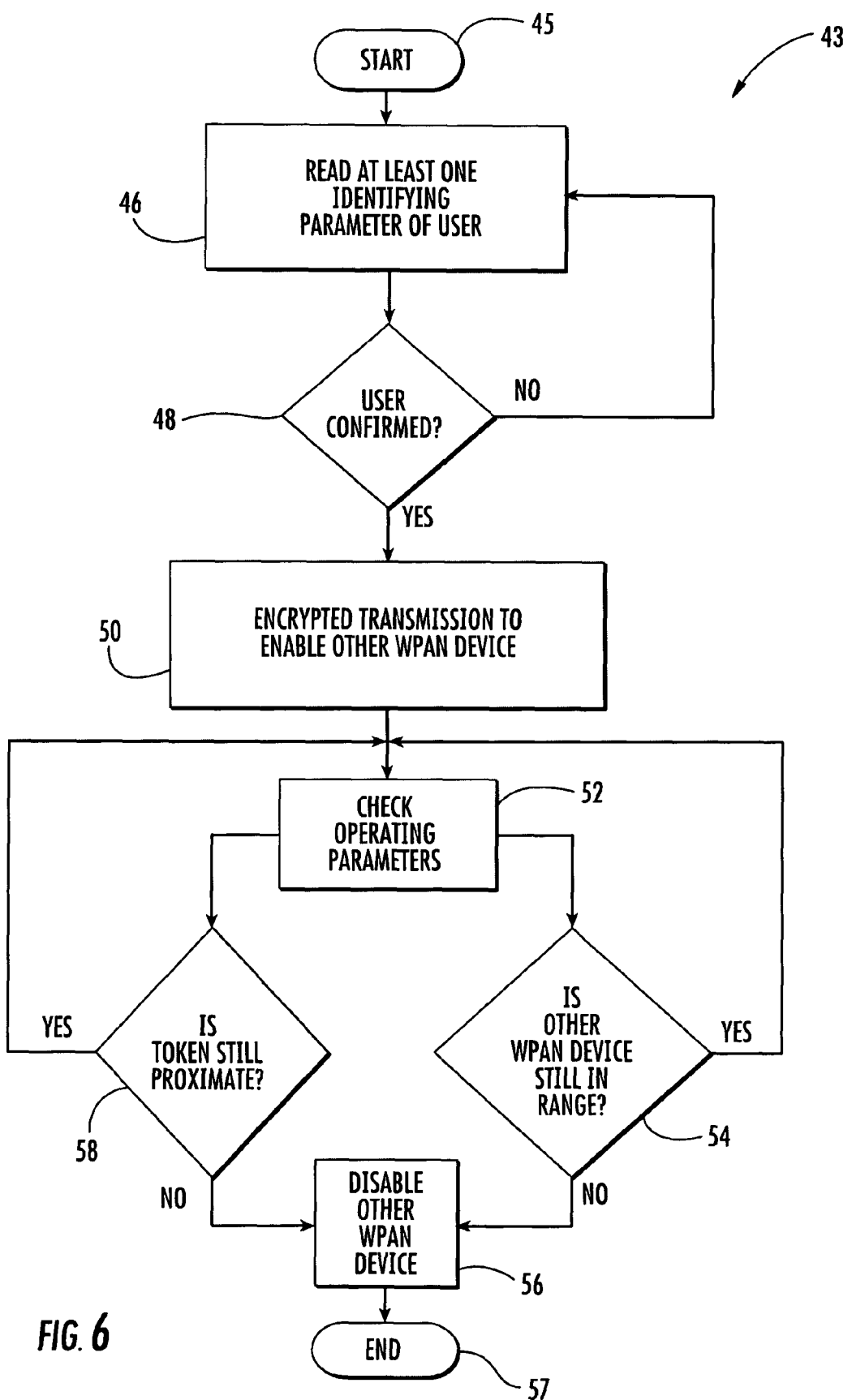
FIG. 6 is a flow chart illustrating a method according to the invention.

A method aspect of the invention is for operating the WPAN system 10 and is now described with reference to the flowchart 43 of FIG. 6. The method is for establishing encrypted wireless communication between a plurality of WPAN devices when in an enabled state and not wirelessly communicating when in a disabled state. At least one of the WPAN devices includes a WPAN identity reader. The method starts at Block 45 and includes reading at least one identifying parameter of a user at Block 46 using the WPAN identity reader. The user can be confirmed as an authorized user based upon reading the at least one identifying parameter at Block 48. Then, the WPAN identity reader wirelessly communicates with at least one other WPAN device to switch the at least one other WPAN device from the disabled state to the enabled state based upon confirming the user is an authorized user (Block 50).

The operation of WPAN system 10 can be affected by different operational parameters, which may be checked at Block 52. For example, the plurality of WPAN devices may have a limited communication range as described previously. The method may further include checking to see if the limited communication range of the WPAN identity reader has been exceeded at Block 54. If the range is exceeded, then the method includes switching the at least one other WPAN device when in the enabled state back to the disabled state at Block 56.

Another operational parameter to be checked at Block 52 is if the identity token is still proximate the WPAN identity reader at Block 58. If so, then maintaining the at least one other WPAN device in the enabled state may be maintained as long as the identifying token is in proximity to the WPAN identity reader. If not, the other WPAN device is disabled at Block 56 before ending (Block 57).

The at least one other WPAN device may be operable to permit user operation thereof when in the enabled state. The method may further include requiring user entry of a password in addition to the at least one other WPAN device being in the enabled state for the at least one other WPAN device to be operable.

Another example of a WPAN device 1000 that may be used in accordance the present invention is further described with reference to FIG. 7. The device 1000 includes a housing 1200, a keyboard 1400 and an output device 1600. The output device shown is a display 1600, which is preferably a full graphic LCD. Other types of output devices may alternately be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

Figure 7:
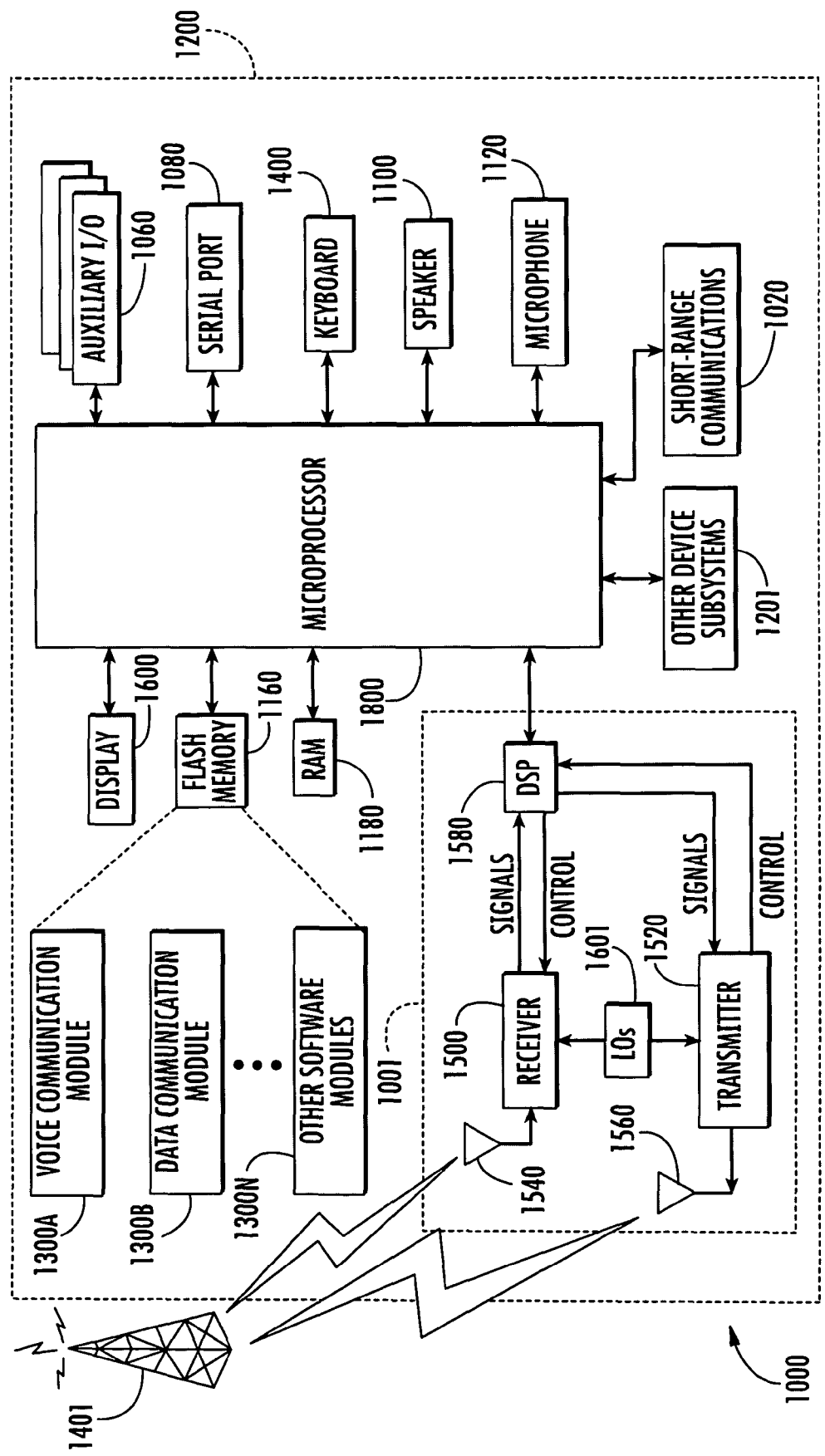
FIG. 7 is a more detailed schematic block diagram of an alternate embodiment of a WPAN device according to the invention.

In addition to the processing device 1800, other parts of the mobile device 1000 are shown schematically in FIG. 7. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TACT™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth communications module to provide for communication with similarly-enabled systems and devices. For example, the interaction between short-range communications subsystem 1020 and the processor 1800 is what enables the device 1000 to communicate with identity reader 12*d* as will be appreciated by those skilled in the art.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless personal area network (WPAN) system comprising:
   a plurality of WPAN devices having a limited communication range and using encrypted wireless communication therebetween when in an enabled state and not wirelessly communicating when in a disabled state; and
   at least one of said WPAN devices comprising a WPAN identity reader for reading at least one identifying parameter of a user, for confirming that the user is an authorized user based upon reading the at least one identifying parameter, and for wirelessly communicating with at least one other WPAN device to switch the at least one other WPAN device and a further WPAN device from the disabled state to the enabled state based upon confirming the user is an authorized user, said at least one other WPAN device wirelessly communicating with said further WPAN device;
   said at least one other WPAN device and said further WPAN device when in the enabled state switching back to the disabled state based upon movement of said at least one other WPAN device beyond the limited communication range with said WPAN identity reader.

2. The WPAN system according to claim 1 further comprising an identifying token carried by a user; and wherein said WPAN identity reader reads said identifying token when in proximity thereto.

3. The WPAN system according to claim 2 wherein said WPAN identity reader continues to wirelessly communicate with the at least one other WPAN device to maintain the at least one other WPAN device in the enabled state as long as the identifying token is in proximity to said WPAN identity reader.

4. The WPAN system according to claim 2 wherein said identifying token comprises a substrate and identifying data carried thereby.

5. The WPAN system according to claim 4 wherein said identifying token further comprises encryption data carried by said substrate.

6. The WPAN system according to claim 5 wherein said encryption data comprises at least one of a public and private encryption key.

7. The WPAN system according to claim 1 wherein the at least one other WPAN device is operable to permit user operation thereof when in the enabled state.

8. The WPAN system according to claim 1 wherein the at least one other WPAN device is operable upon user entry of a password in addition to being in the enabled state.

9. The WPAN system according to claim 1 wherein said WPAN devices wirelessly communicate using a Bluetooth protocol.

10. The WPAN system according to claim 1 wherein said WPAN devices wirelessly communicate using a Federal Information Processing Standard (FIPS) compliant encryption protocol.

11. The WPAN system according to claim 1 wherein at least one of said plurality of WPAN devices comprises a computer, a printer, a scanner, a camera, a barcode scanner, a Global Positioning System (GPS) device, a personal digital assistant, and a wireless email device.

12. The WPAN system according to claim 1 wherein said WPAN identity reader comprises:
   a portable housing;
   a reader carried by said portable housing for reading the at least one identifying parameter of a user;
   a limited communication range WPAN transceiver carried by said portable housing; and
   a processor carried by said portable housing and connected to said reader and said limited communication range WPAN transceiver.

13. The WPAN system according to claim 12 wherein said reader comprises at least one of a magnetic stripe reader, a smart card reader, and a biometric characteristic reader.

14. A method for operating a wireless personal area network (WPAN) system comprising a plurality of WPAN devices having a limited communication range with at least one of the WPAN devices comprising a WPAN identity reader, the method comprising:

using the WPAN identity reader for
reading at least one identifying parameter of a user,
confirming that the user is an authorized user based upon reading the at least one identifying parameter, and
wirelessly communicating with at least one other WPAN device to switch the at least one other WPAN device and a further WPAN device from a disabled state to an enabled state based upon confirming the user is an authorized user, the at least one other WPAN device and the further WPAN device using encrypted wireless communication when in the enabled state and not wirelessly communicating when in the disabled state, the at least one other WPAN device wirelessly communicating with the further WPAN device, and the at least one other WPAN device and the further WPAN device when in the enabled state switching back to the disabled state based upon movement beyond the limited communication range of the at least one other WPAN device with the WPAN identity reader.

15. The method according to claim 14 further comprising using the WPAN identity reader for reading an identifying token carried by a user when the identifying token is in proximity of the WPAN identity reader.

16. The method according to claim 15 further comprising continuing wireless communication between the WPAN identity reader and the at least one other WPAN device to maintain the at least one other WPAN device in the enabled state as long as the identifying token is in proximity to the WPAN identity reader.

17. The method according to claim 14 further comprising requiring a user to enter a password for the at least one other WPAN device to be operable in addition to the at least one other WPAN device being in the enabled state.

* * * * *